US012340765B2

(12) United States Patent
Yao et al.

(10) Patent No.: US 12,340,765 B2
(45) Date of Patent: Jun. 24, 2025

(54) IMAGE CAPTURE DEVICE WITH VARIABLE REFRESH RATE SIGNAL PROCESSING CAPABILITY AND IMAGE PROCESSING METHOD THEREOF

(71) Applicant: AVerMedia Technologies, Inc., New Taipei (TW)

(72) Inventors: Yen-Cheng Yao, New Taipei (TW); Chia-Jung Hsiao, New Taipei (TW)

(73) Assignee: AVERMEDIA TECHNOLOGIES, INC., New Taipei (TW)

( * ) Notice: Subject to any disclaimer, the term of this patent is extended or adjusted under 35 U.S.C. 154(b) by 0 days.

(21) Appl. No.: 18/479,904

(22) Filed: Oct. 3, 2023

(65) Prior Publication Data

US 2024/0119910 A1 Apr. 11, 2024

(30) Foreign Application Priority Data

Oct. 7, 2022 (TW) ................................ 111138451

(51) Int. Cl.
*G09G 3/34* (2006.01)

(52) U.S. Cl.
CPC ....... *G09G 3/3406* (2013.01); *G09G 2310/08* (2013.01); *G09G 2320/0247* (2013.01); *G09G 2340/0435* (2013.01)

(58) Field of Classification Search
None
See application file for complete search history.

(56) References Cited

U.S. PATENT DOCUMENTS

2017/0243548 A1* 8/2017 Wang ........................ G09G 3/20
2018/0090075 A1* 3/2018 Garbacea ............. G09G 3/3225
2020/0202816 A1* 6/2020 Kim ..................... G09G 3/2092
2022/0036812 A1* 2/2022 Noh ..................... G09G 3/3233
2022/0262305 A1* 8/2022 Chun .................. G09G 3/3208
2023/0030201 A1* 2/2023 Youn ...................... G09G 5/006

* cited by examiner

*Primary Examiner* — Kenneth Bukowski
(74) *Attorney, Agent, or Firm* — McClure, Qualey & Rodack, LLP

(57) ABSTRACT

The invention provides an image capture device and an image processing method thereof. The image processing method includes the following steps. First, an image signal source is received by a receiving unit, wherein the image signal source has a plurality of image frames and plurality corresponding image information or plurality of corresponding variable refresh rate (VRR) related information. Next, it is determined whether the image signal source is a VRR signal, and a determination result is generated. A time stamp of each image frame is calculated according to the VRR-related information if the determination result is positive, wherein the time stamps correspond to a dynamic frame interval respectively. Next, the image frames are respectively converted into a corresponding output packet. Finally, the output packets are respectively integrated with their respective time stamps to generate a dynamic frame interval output packet.

10 Claims, 7 Drawing Sheets

IMAGE CAPTURE DEVICE WITH VARIABLE REFRESH RATE SIGNAL PROCESSING CAPABILITY AND IMAGE PROCESSING METHOD THEREOF

CROSS REFERENCE TO RELATED APPLICATIONS

This Non-provisional application claims priority under 35 U.S.C. § 119(a) on Patent Application No. 111138451 filed in Republic of China on Oct. 7, 2022, the entire contents of which are hereby incorporated by reference.

BACKGROUND

1. Technical Field

The present invention relates to an electronic device and an image processing method thereof, and in particular to an image capture device and its image processing method.

2. Description of Related Art

High-definition and high-precision images are commonly pursued by modern users, especially for competitive gamers. To achieve better image quality, increasing the refresh rate is a commonly used approach, such as using systems with a refresh rate of 144 Hz or 240 Hz (including display, CPU, and GPU hardware). However, staying in a high refresh rate state for extended periods can increase power consumption and decrease hardware performance. Therefore, Variable Refresh Rate (VRR) technology is one of the means used to address these issues.

The so-called VRR technology involves using a higher refresh rate for dynamic image portions that require high precision and a lower refresh rate for static image portions. However, if either the input or output in the system cannot perform the calculations corresponding to VRR technology, it will result in image defects or display screen stuttering.

In addition, gamers often use the image capture device to capture or record streaming video. The image capture device, such as a video capture card, is an electronic device that captures consecutive digital static frames from analog video signals or digital video streams. These frames are captured in digital form, and the resulting digital signals are displayed, stored, or transmitted to other devices directly or after compression. However, due to the limitations of existing image capture devices in handling VRR signals, the traditional approach is to discard excess frames or fill in missing frames according to the image capture device's existing refresh rate settings. In other words, after processing through the image capture device, only a signal with a fixed image refresh rate can be output. This not only defeats the purpose of using VRR technology but also results in an uneven display due to dropped or filled frames.

Therefore, providing an image capture device with VRR signal processing capability and its image processing method is currently one of the crucial challenges.

SUMMARY OF THE INVENTION

One of the objectives of the present invention is to provide an image capture device and its image processing method that can select an appropriate image processing method according to whether the image signal source is a VRR signal or not.

To achieve the above, the image processing method for an image capture device in the present invention includes the following steps. First, an image signal source is received by a receiving unit, where the image signal source has a plurality of image frames and the plural of corresponding image information or plural of corresponding VRR-related information. Next, it determines whether the image signal source is a VRR signal and generates a determination result accordingly. When the determination result is affirmative, it generates a corresponding time stamp for each of the image frames according to the plural VRR-related information, where the time stamps correspond to a dynamic frame interval, respectively. When the determination result is negative, it generates the time stamp for each of the image frames according to the plural image information, where the time stamps correspond to a fixed frame interval, respectively. Then, the image frames are converted into a corresponding output packet, respectively. Finally, the output packets are integrated with the respective time stamps, respectively, to generate a dynamic-frame-interval output packet or a fixed-frame-interval output packet.

In one embodiment, prior to determining whether the image signal source is the VRR signal, it further includes detecting whether the receiving unit has the capability to detect a VRR setting parameter. When the receiving unit lacks the capability to detect VRR setting parameters, it then collects the VRR-related information from the image signal source.

In one embodiment, the plural of VRR-related information includes resolution information, frame output frequency, image width information, image height information, and clock frequency information.

In one embodiment, in the step of detecting whether the receiving unit has the capability to detect the VRR setting parameter, it is synchronously or sequentially detected whether the receiving unit can detect an HDMI VRR signal, a FreeSync VRR signal and/or a G-Sync VRR signal.

In one embodiment, the output packet is a packet that complies with the USB specification.

In one embodiment, the image processing method further includes the following steps. Firstly, when outputting the dynamic-frame-interval output packet or the fixed-frame-interval output packet, simultaneously monitor image signal source received by the receiving unit. Next, determine whether the image signal source is present. When the image signal source is not present, use the fixed frame interval. When the image signal source is present, determine whether the image signal source has changed. If the determination result is no change, continue monitoring image signal sources received by the receiving unit. If the determination result is a change, then further determine whether the image signal source is the VRR signal.

In one embodiment, the dynamic-frame-interval output packet or the fixed-frame-interval output packet is output to an electronic device. Before the step of converting the image frames into the corresponding output packets, respectively, it further includes determining whether a setting of the electronic device can achieve optimal image smoothness. When the determination result is negative, it prompts the optimal setting value on the electronic device.

In addition, to achieve the above, the present invention provides another image processing method for an image capture device, which includes the following steps. First, an image signal source is received by a receiving unit, where the image signal source has a plurality of image frames and the plural of corresponding VRR-related information. Next, when the image signal source is a VRR signal, it generates a corresponding time stamp for each of the image frames according to the plural of VRR-related information, where the time stamps correspond to a dynamic frame interval, respectively. Then, the image frames are converted into a corresponding output packet, respectively. Finally, the output packets are integrated with the respective time stamps, respectively, to generate a dynamic-frame-interval output packet.

In one embodiment, the image signal source also includes a plurality of corresponding image information, and the image processing method further includes the following steps. When the image signal source is not the VRR signal, it generates the time stamps corresponding to each image frame according to the plural of image information. The time stamps correspond to a fixed frame interval. After converting the image frames into the output packets, respectively, a fixed-frame-interval output packet is generated.

Furthermore, to achieve the above, the present invention also provides an image capture device comprising a receiving unit, an image processing unit, a computing unit, and a communication processing unit. The receiving unit is to receive an image signal source, which has a plurality of image frames and the plural of corresponding image information or plural of corresponding VRR-related information. The image processing unit is coupled with the receiving unit to receive the image signal source, determine whether the image signal source is a VRR signal, and output a determination result and the image signal source. The computing unit is coupled with the image processing unit to receive the determination result and the image signal source and processes the image signal source according to the determination result. When the determination result is affirmative, the computing unit generates a time stamp for each of the corresponding image frames according to the plural VRR-related information, and the time stamps correspond to a dynamic frame interval. When the determination result is negative, the computing unit generates the time stamp for each of the corresponding image frames according to the plural image information, and the time stamps correspond to a fixed frame interval. The communication processing unit is coupled with the computing unit and converts the image frames into a corresponding output packet, respectively. It then integrates the output packets with the respective time stamps, respectively, to generate a dynamic-frame-interval output packet or a fixed-frame-interval output packet.

In one embodiment, the time stamp is calculated according to resolution information, clock frequency information and/or counter value information of the image signal source.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

In order to facilitate understanding of the content of the invention by those skilled in the art and to enable the implementation of the content of the invention, the following is provided in conjunction with preferred embodiments and drawings.

Regarding the term "coupling" used in the text, it can refer to two or more elements, components, or devices making direct physical contact with each other, making indirect physical contact with each other, interacting or operating with each other, or being connected electrically (with electrical or telecommunication signals) either directly or indirectly. In addition, the term "HDMI VRR signal", "FreeSync VRR signal" and "G-Sync VRR signal" used in the text, respectively represent the VRR signal that complies with HDMI, FreeSync, or G-Sync specifications.

Figure 1:
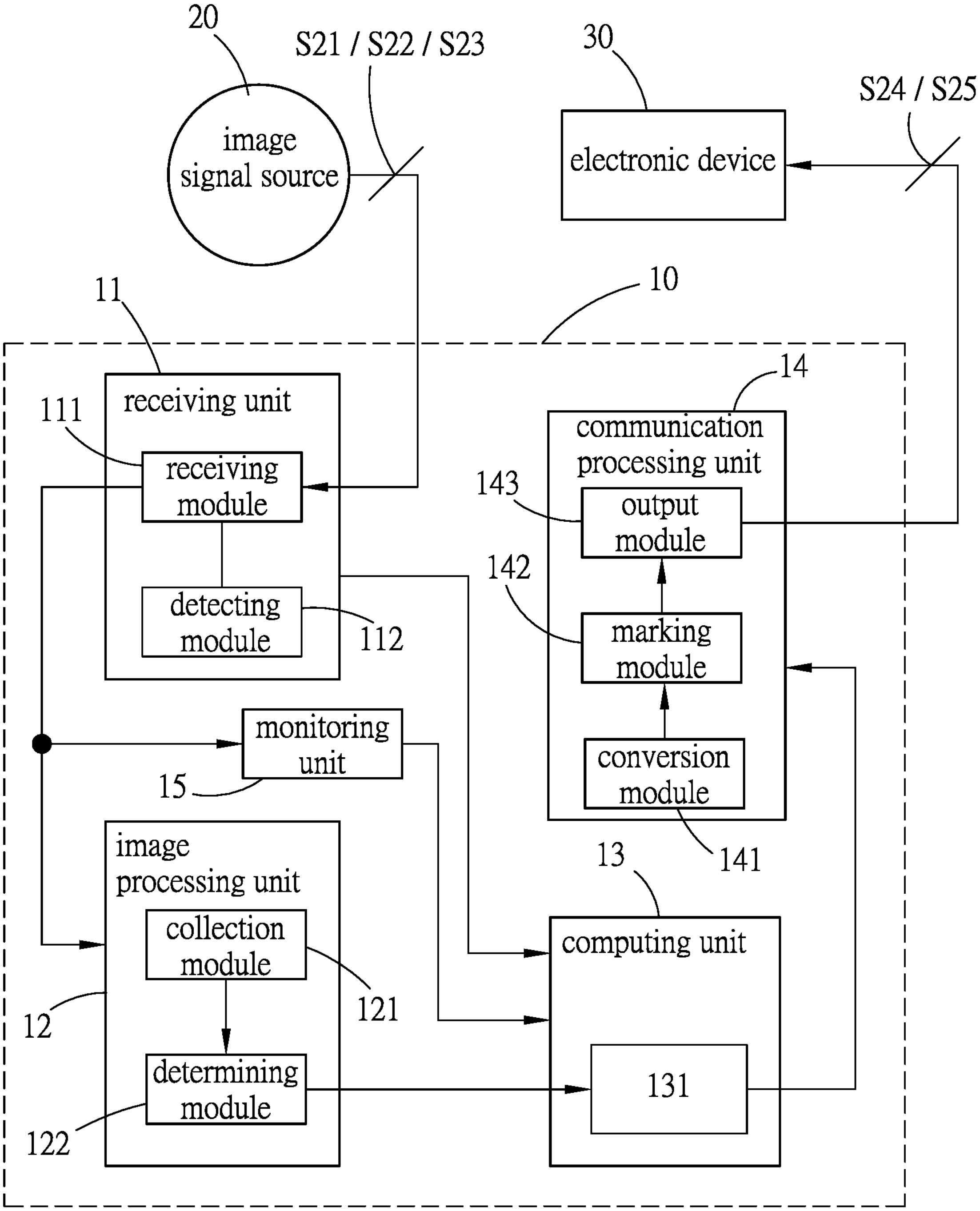
FIG. 1 is a block diagram of the image capture device according to a preferred embodiment of the invention.

Please refer to FIG. 1. In one of the preferred embodiments of the present invention, an image capture device 10 is coupled to an image signal source 20 and an electronic device 30. It outputs a processed image signal from the image signal source 20 to the electronic device 30. The image signal source 20 can be any device that outputs digital image signals, which can have a fixed refresh rate and/or a variable refresh rate (VRR). Additionally, the image signal source 20 includes a plurality of image frames S21 and a plurality of image information S22 or a plurality of VRR-related information S23 corresponding thereto. The image information S22 may include but is not limited to metadata or Infoframe, where metadata may include, for example, Video Timing Extended Metadata (VTEM), and Infoframe may include, for example, SPD Infoframe. The VRR-related information S23 may include but is not limited to resolution information, frame output frequency, image width information, image height information, and pixel clock information. It should be noted that the image information S22 and the VRR-related information S23 may include part of the same information, such as metadata or resolution information, etc. The electronic device 30 includes but is not limited to, display devices, audio-video recording devices, or computers that are capable of processing or playing back images.

In addition, it is worth noting that the VRR image signal mentioned above can originate from the same signal source. For instance, in one scenario, a higher refresh rate may be used for high-definition dynamic images, while a lower refresh rate may be used for static images. In another scenario, different refresh rates can be used for various scenes or pages in a game, for example, lower refresh rates for game menu screens and higher refresh rates for in-game visuals.

The image capture device 10 is, for example, an image capture card or an image capture box, which includes a receiving unit 11, an image processing unit 12, a computing unit 13, a communication processing unit 14, and a monitoring unit 15.

The receiving unit 11 has a receiving module 111 and a detecting module 112 coupled to each other, and are coupled to the image signal source 20, the image processing unit 12, the computing unit 13, and the monitoring unit 15, respectively. The receiving unit 11 outputs the image frame S21, the image information S22 and/or the VRR-related information S23 of the image signal source 20 to each relevant unit.

The image processing unit 12 has a collection module 121 and a determining module 122 coupled to each other. The image processing unit 12 performs corresponding necessary processing on the image signal source 20 and then outputs it.

The computing unit 13 includes a time stamp generating module 131. The computing unit 13 is coupled to the receiving unit 11, the image processing unit 12, and the monitoring unit 15, respectively, to receive related data from the image signal source 20 (including raw data and processed data). After computation, the computing unit 13 outputs the image signal source 20 and its related data to the communication processing unit 14.

The communication processing unit 14 has a conversion module 141, a marking module 142, and an output module 143, where the marking module 142 is coupled to the conversion module 141 and the output module 143, respectively. The communication processing unit 14 is coupled to the electronic device 30 to convert the processed image signal source 20 into a dynamic-frame-interval output packet S24 or a fixed-frame-interval output packet S25, and output it to the electronic device 30.

Figure 2:
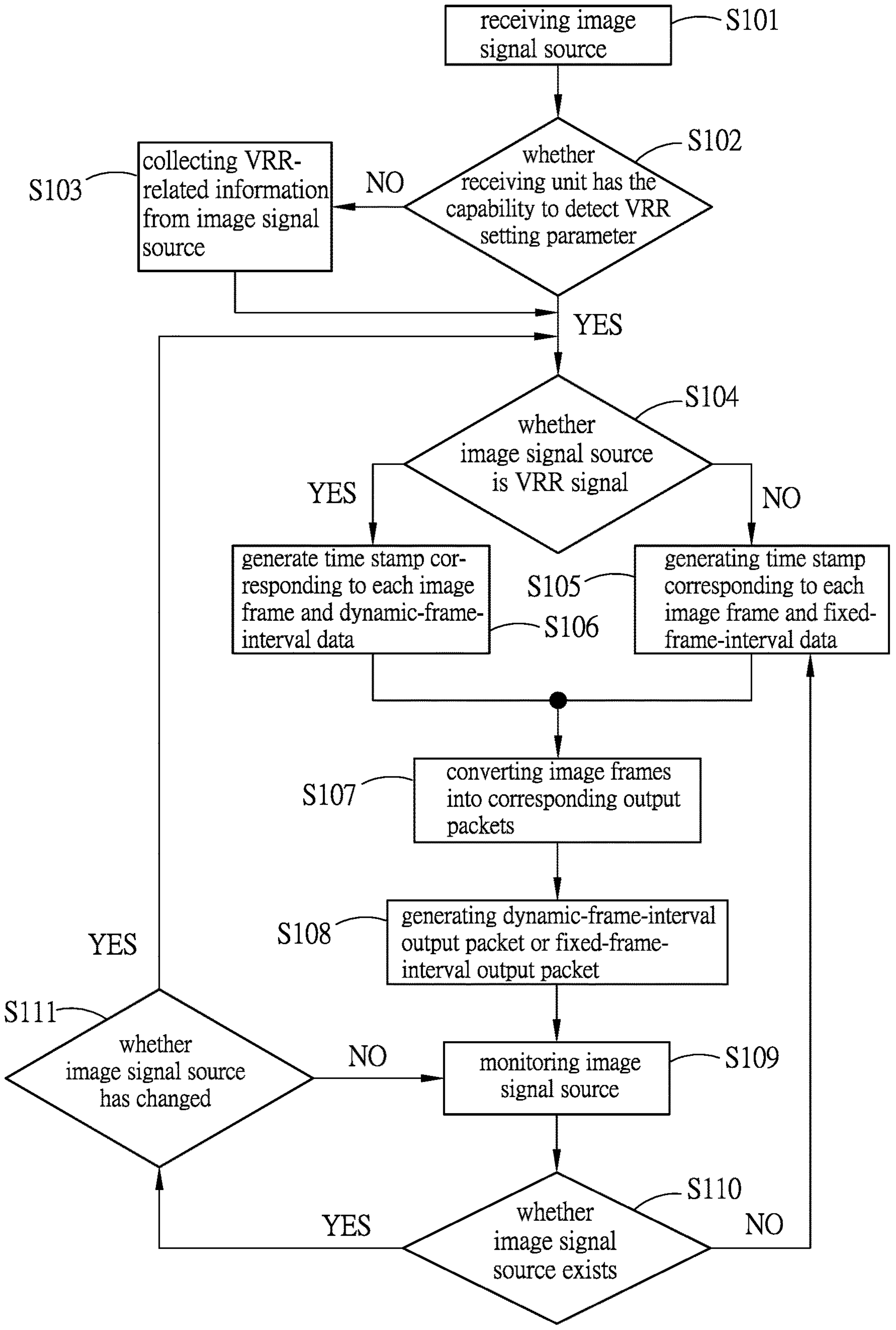
FIG. 2 is a flow chart of the image processing method of the image capture device with the VRR signal processing capability according to the first preferred embodiment of the invention.

Please refer to FIG. 1 and FIG. 2 to illustrate the image processing method of the image capture device with the VRR signal processing capability according to the first preferred embodiment of the invention. As shown in FIG. 2, the image processing method includes steps S101 to S111.

Step S101 is to receive the image signal source 20 including the image frame S21, the image information S22, and the VRR-related information S23 by the receiving module 111 of the receiving unit 11.

Step S102 is to use the detecting module 112 of the receiving unit 11 to detect whether the receiving unit 11 has the capability to detect a VRR setting parameter. When the receiving unit 11 lacks the capability to detect the VRR setting parameter, step S103 is executed. When the receiving unit 11 has the capability to detect the VRR setting parameter, step S104 is executed.

Step S103 is to enable the collection module 121 of the image processing unit 12 to collect the VRR-related information S23 from the image signal source 20. Among them, the characteristics of the VRR signal are that the resolution, frame output frequency, image width, image height, and pixel clock may have corresponding variations, so the VRR-related information S23 can be used as the basis for determination. In this embodiment, the detecting module 112 enables the collection module 121. In other embodiments, the detecting module 112 may notify other modules, such as the control module, to execute the enabling process.

Step S104 is to determine whether the image signal source 20 is the VRR signal by the determining module 122 of the image processing unit 12. When the determination result is negative (or so-called "False" or "NO"), meaning that the image signal source 20 is not the VRR signal, Step S105 is executed. When the determination result is affirmative (or so-called "True" or "YES"), meaning that the image signal source 20 is the VRR signal, Step S106 is executed. To further explain, when the image signal source 20 is the VRR signal and the receiving unit 11 has the capability to detect the VRR setting parameters, the receiving unit 11 can directly transmit a time stamp corresponding to each image frame S21 in the image signal source 20 to the computing unit 13. Additionally, when the image signal source 20 is the VRR signal and the receiving unit 11 lacks the capability to detect VRR setting parameters, the determining module 122 can determine whether the image signal source 20 is the VRR signal according to the VRR-related information S23 of the image signal source 20, which is collected by the collection module 121.

Step S105 is to use the time stamp generating module 131 of the computing unit 13 to generate the time stamp corresponding to each image frame S21 according to the image information S22, and the time stamp corresponds to a fixed frame interval. To further explain, when a new image frame is input to the image capture device 10, an interrupt (or called "interval") signal can be issued, or polling can be used to confirm that the receiving unit 11 has received the new image frame. The image information S22 is then recorded, and after computing, the respective time stamp for that image frame S21 can be obtained.

Here, it is assumed that the clock frequency declared by the image capture device 10 is 100 MHz and the resolution is 1080p60, the following is an example of generating the time stamps (including a time stamp P1A, a time stamp P2A, and a time stamp P3A) corresponding to three image frames (including a frame F1A, a frame F2A, and a frame F3A):

$$\text{interval}=100000000(\text{Hz})/60=1666666;$$

$$\text{the time stamp } P1A=0+\text{interval}=1666666;$$

$$\text{the time stamp } P2A=\text{the time stamp } P1A+\text{interval}=3333332;$$

$$\text{the time stamp } P3A=\text{the time stamp } P2A+\text{interval}=4999998.$$

Accordingly, the time stamp of the frame F1A, the frame F2A, and the frame F3A corresponds to the fixed frame interval and is 1666666.

Step S106 is to use the time stamp generating module 131 of the computing unit 13 to generate the time stamp corresponding to each image frame S21 according to the VRR-related information S23, and the time stamps correspond to a dynamic frame interval. To further explain, when the computing unit 13 has received the time stamp corresponding to each image frame S21, it can directly obtain the time stamp corresponding to the image frame S21. In addition, when a new image frame is input to the image capture device 10, an interrupt (or called "interval") signal can be issued, or polling can be used to confirm that the receiving unit 11 has received the new image frame. The image information, such as a counter value, is then recorded, and after computing, the respective time stamp for that the new image frame can be obtained.

Figure 3:
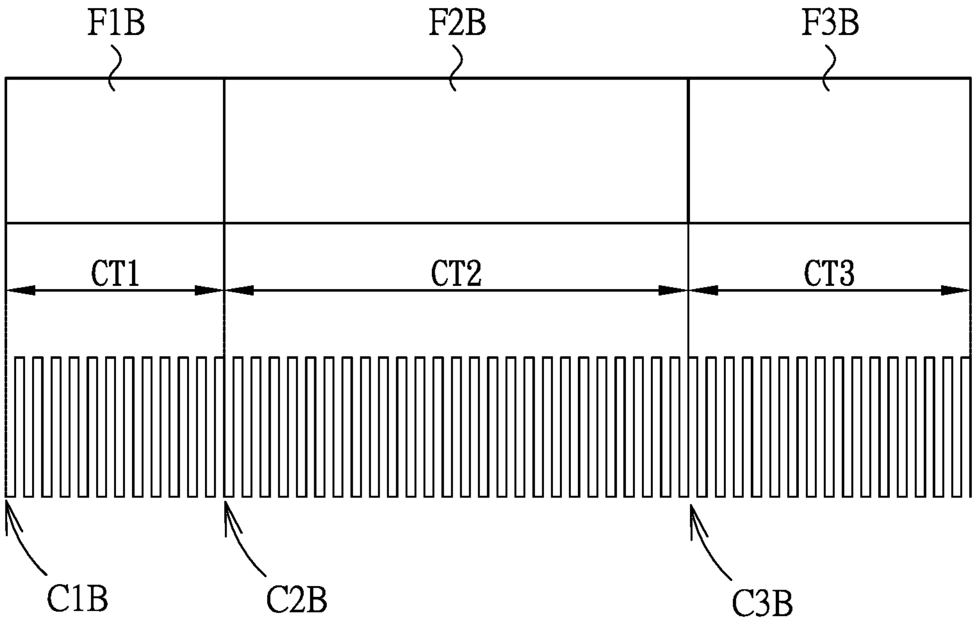
FIG. 3 is a schematic diagram showing the corresponding relationship between the image frame and the count value.

Next, please refer to FIG. 3. Here, it is assumed that the clock frequency declared by the image capture device 10 is 100 MHz, the counter counts 150 times as 1 microsecond (us), and the microsecond corresponds to the unit of Hz, the following is an example of generating the time stamps (including a time stamp P1B, a time stamp P2B, and a time stamp P3B) corresponding to three image frames (including a frame F1B, a frame F2B, and a frame F3B):

When the frame F1B, the frame F2B, and the frame F3B are received in sequence, the count value C1B, the count value C2B, and the count value C3B can be obtained, respectively. As can be seen from FIG. 3, the counting interval CT1 between the count value C1B and the count value C2B has been counted 1,250,000 times, and the counting interval CT2 between the count value C2B and the count value C3B has been counted 2,500,000 times.

the counting interval $CT1=C2B-C1B=1250000$;

interval $1B=(1250000/150)(\text{us})\times 100(\text{Hz})=833333$;

the time stamp $P1B=0+$interval $1B=833333$;

the counting interval $CT2=C3B-C2B=2500000$;

interval $2B=(2500000/150)(\text{us})\times 100(\text{Hz})=1666666$;

the time stamp $P2B=$the time stamp $P1B+$interval $2B=2499999$.

Accordingly, the time stamps for the frame F1B and the frame F2B can be obtained. Additionally, the time stamp for the frame F3B must be calculated in cooperation with the image information of the next frame to obtain it.

Next, return to FIG. 1 and FIG. 2, step S107 is to convert the image frames S21 into a corresponding output packet, respectively by the conversion module 141 of the communication processing unit 14. These image frames can be in various formats such as RGB, NV12, YUY12, P010, H.264, H.265, MJPEG, and others. Additionally, the output packet complies with USB standards or network transmission specifications.

Next, step S108 is to use the marking module 142 of the communication processing unit 14 to integrate the output packets with their respective time stamps to generate a dynamic-frame-interval output packet S24 or to generate a fixed-frame-interval output packet S25, and output by the output module 143. In short, when the time stamps corresponding to each image frames S21 are generated by step S105, the fixed-frame-interval output packet S25 will be generated after integration, and when the time stamps corresponding to each image frames S21 are generated by step S106, the dynamic-frame-interval output packet S24 will be generated after integration.

Next, in step S109, when outputting the dynamic-frame-interval output packet S24 or the fixed-frame-interval output packet S25, the monitoring unit 15 simultaneously monitors the image signal source received by the receiving unit 11. It is worth noting that the monitoring unit 15 simultaneously monitors image signals in the image signal source that have a time difference from the previously processed image signal, rather than referring to the same image signal.

Step S110 is to determine whether image signal source exists by the monitoring unit 15. When the image signal source does not exist, the process returns to step S105; and when the image signal source exists, step S111 is executed. Here, if the image signal source does not exist, such as signal interruption, the device can output an image with the fixed frame interval, displaying a message such as "No signal".

Step S111 is to determine whether there are changes in the image signal source and the image signal source 20. Here, a change could be, for example, if the image information (such as resolution, width, height, etc.) in the previous and current image signal sources is different. If there is no change between the previous and current image signal sources, the process returns to step S109; and if there is a change between the previous and current image signal sources, step S104 is executed again.

It is worth noting that in another implementation of the above-described first preferred embodiment of the image processing method, the image capture device 10 can directly get whether the image signal source is the VRR signal. Therefore, the determination step S104 may be omitted. At the same time, when the image signal source is the VRR signal, step S105 may also be omitted, and only step S106, which generates dynamic-frame-interval data, and its subsequent related steps are executed.

Figure 4:
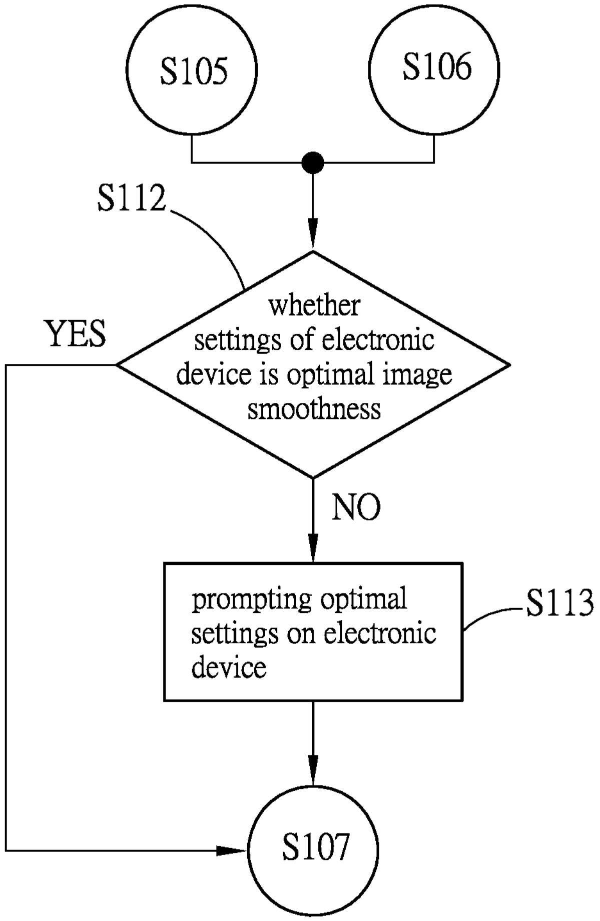
FIG. 4 is a partial flow chart of the image processing method of the image capture device with the VRR signal processing capability according to the second preferred embodiment of the invention.

Next, please refer to FIGS. 1, 2, and 4 simultaneously to illustrate the image processing method of the second preferred embodiment of the image capture device with VRR signal processing capability. As shown in FIG. 4, the difference from the first preferred embodiment is that the second preferred embodiment adds steps S112 and S113 before step S107. To avoid redundancy, the same steps as mentioned above will not be repeated.

Step S112 involves determining whether the settings of the electronic device 30 can display the optimal image smoothness. When the settings of the electronic device 30 are for optimal image smoothness, step S107 is executed. However, when the settings of the electronic device 30 are not for optimal image smoothness, step S113 is executed. For example, if the image signal source 20 is 1080p120 and assuming that the dynamic-frame-interval output packet or fixed-frame-interval output packet output by the communication processing unit 14 is 1080p60, it may be necessary to discard 50% of the frames, which will affect image smoothness.

Step S113 involves displaying the recommended optimal settings on the electronic device 30 and then proceeding to execute step S107. For instance, this could display a suggested optimal setting of 1080p120 on the electronic device 30 to comply with the specifications of the image signal source 20.

Next, please refer to FIGS. 1, 2, 5, and 6 simultaneously to illustrate the image processing method of the third preferred embodiment of the image capture device with VRR signal processing capability. In the third preferred embodiment, the difference from the second preferred embodiment is in further explaining step S101 and step S102 and adding step S114 and step S115. To avoid redundancy, the same steps as mentioned above will not be repeated.

Figure 5:
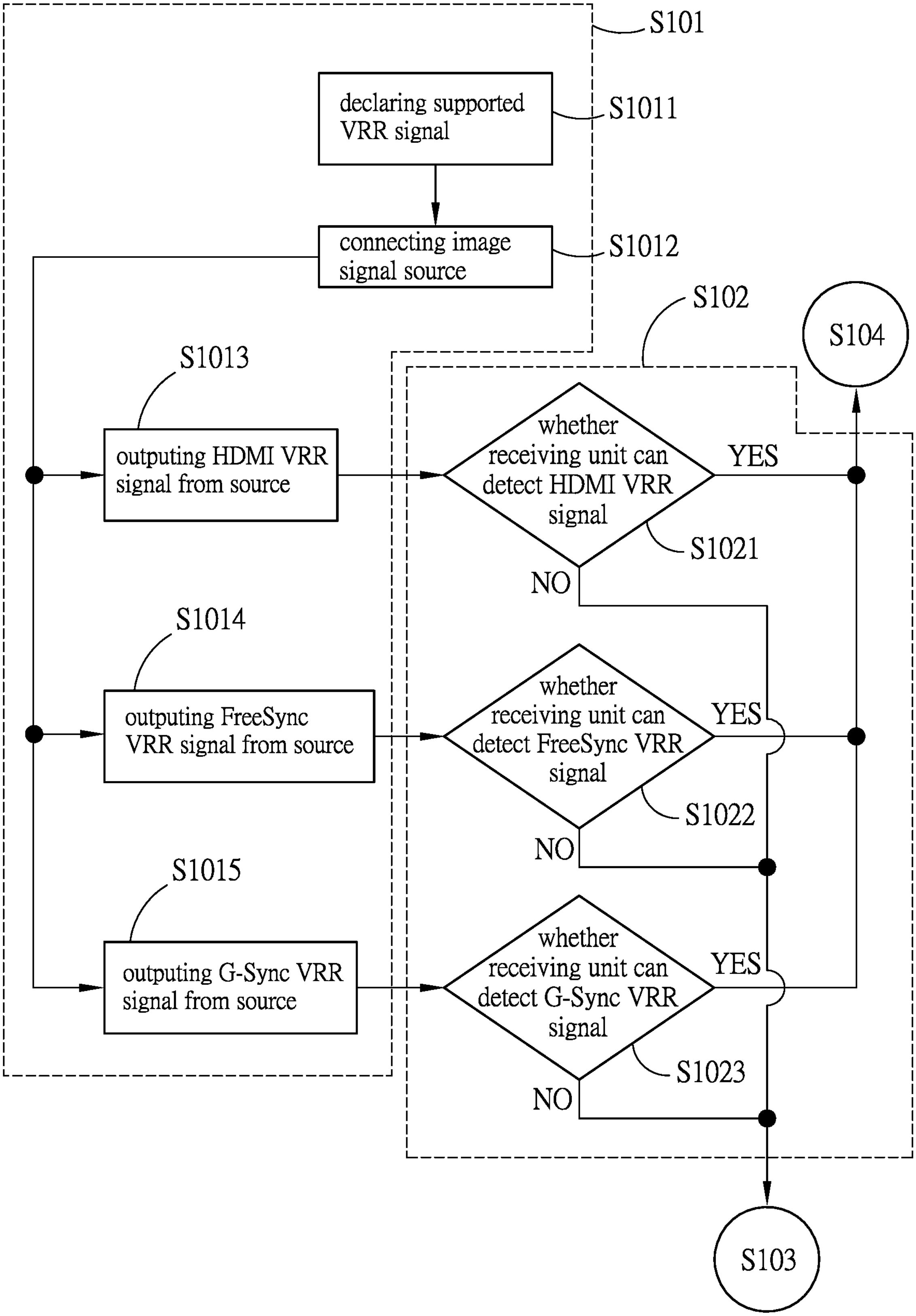
FIG. 5 is a partial flow chart of the image processing method of the image capture device with the VRR signal processing capability according to the third preferred embodiment of the invention.

As shown in FIG. 5, receiving the image signal source in step S101 also includes steps S1011 to S1015.

Step S1011 is to declare the VRR signal supported by the image capture device 10. In this embodiment, the image capture device 10 declares the types of VRR signals and frame rate ranges supported through Extended Display Identification Data (EDID) or Display Identification Data (DisplayID) by the receiving unit 11.

Step S1012 is to connect the image signal source, that is, to connect the device that provides the image signal source 20 to the image capture device 10. In this embodiment, the connection interface can include but is not limited to USB, HDMI, or Display Port.

Next, steps S1013 to S1015 can be executed simultaneously. Step S1013 is to output the HDMI VRR signal from the source end. Step S1014 is to output the FreeSync VRR signal from the source end. Step S1015 is to output the G-Sync VRR signal from the source end.

In addition, step S102 also includes step S1021 to step S1023, wherein step S1021 is executed immediately after step S1013, step S1022 is executed immediately after step S1014, and step S1023 is executed immediately after step S1015.

Step S1021 is to determine whether the receiving unit 11 has the capability to detect the HDMI VRR signal. When the determination result is affirmative, step S104 is executed; when the determination result is negative, step S103 is executed.

Step S1022 is to determine whether the receiving unit 11 has the capability to detect the FreeSync VRR signal. When the determination result is affirmative, step S104 is executed; when the determination result is negative, step S103 is executed.

Step S1023 is to determine whether the receiving unit 11 has the capability to detect the G-Sync VRR signal. When the determination result is affirmative, step S104 is executed; when the determination result is negative, step S103 is executed.

Figure 6:
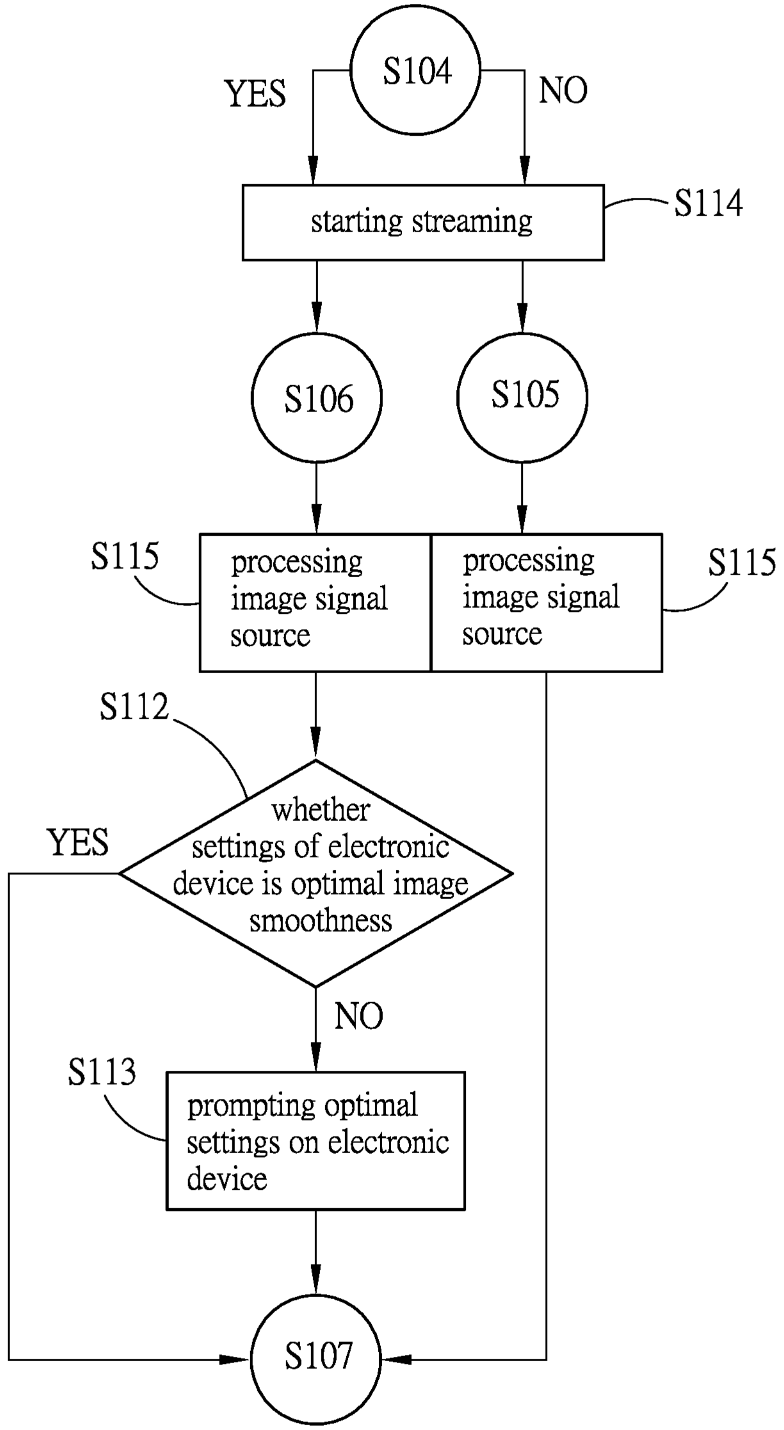
FIG. 6 is a partial flow chart of the image processing method of the image capture device with the VRR signal processing capability according to the third preferred embodiment of the invention.

Next, as shown in FIG. 6, after step S104, step S114 is added. In step S114, the electronic device 30 starts streaming. In this embodiment, the connection interface between the image capture device 10 and the electronic device 30 is, for example, a USB interface, and here the electronic device 30 initiates USB streaming.

Next, after executing step S105 to generate fixed-interval-frame data or executing step S106 to generate dynamic-interval-frame data depending on the type of the image signal source 20, step S115 is executed. In FIG. 6, for illustrative purposes, the same step S115 is used in two blocks to demonstrate the processing of image signal sources with fixed-interval-frame data or dynamic-interval-frame data, respectively.

Step S115 involves processing the image signal source 20 according to the settings of the electronic device 30. In this embodiment, the term "processing" includes but is not limited to frame rate conversion (FRC) or image scaling performed on the image signal source 20.

In the example of fixed-frame-interval data, after processing the image signal in step S115, step S107 is then executed. In the example of dynamic-frame-interval data, after processing the image signal in step S115, step S112 is then executed. Step S112, as described in the second preferred embodiment, will not be reiterated here.

Figure 7:
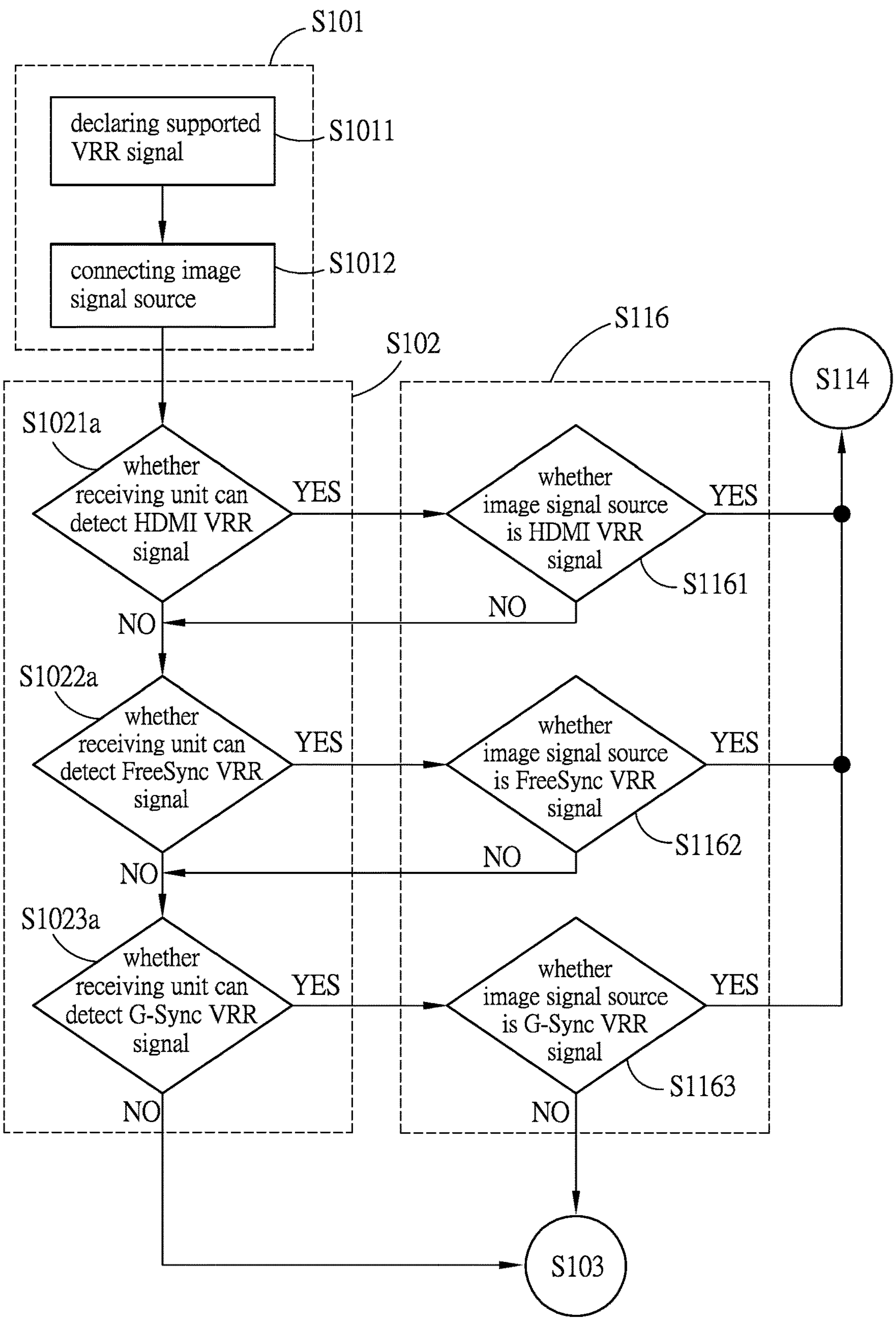
FIG. 7 is a partial flow chart of the image processing method of the image capture device with the VRR signal processing capability according to the fourth preferred embodiment of the invention.

Next, please refer to FIGS. 1, 2, and 7 simultaneously to illustrate the image processing method of the fourth preferred embodiment of the image capture device with VRR signal processing capability. As shown in FIG. 7, the fourth preferred embodiment differs from the first preferred embodiment in that the fourth preferred embodiment further explains step S101 and step S102 and adds step S116 after step S102. To avoid redundancy, the same steps as mentioned above will not be repeated.

Step S101 includes the aforementioned steps S1011 and S1012. Among them, step S1011 is to declare the VRR signal supported by the image capture device 10. Step S1012 is to connect the image signal source, which is to connect the image capture device 10 to the source end, and after the connection, the source end outputs the image signal source according to the announcement.

Step S102 also includes steps S1021*a* to S1023*a*. In this embodiment, steps S1021*a* to S1023*a* are executed sequentially.

Step S1021*a* is to determine whether the receiving unit 11 has the capability to detect the HDMI VRR signals. When the determination result is affirmative, step S1161 is executed; when the determination result is negative, step S1022*a* is executed.

Step S1022*a* is to determine whether the receiving unit 11 has the capability to detect the FreeSync VRR signals. When the determination result is affirmative, step S1162 is executed; when the determination result is negative, step S1023*a* is executed.

Step S1023*a* is to determine whether the receiving unit 11 has the capability to detect the G-Sync VRR signals. When the determination result is affirmative, step S1163 is executed; when the determination result is negative, step S103 is executed.

Step S116 includes steps S1161 to S1163, which respectively correspond to steps S1021*a* to S1023*a*.

Step S1161 is to determine whether the received image signal source 20 is the HDMI VRR signal. When the determination result is affirmative, step S114 is executed; when the determination result is negative, step S1022*a* is executed.

Step S1162 is to determine whether the received image signal source 20 is the FreeSync VRR signal. When the determination result is affirmative, step S114 is executed; when the determination result is negative, step S1023*a* is executed.

Step S1163 is to determine whether the received image signal source 20 is the G-Sync VRR signal. When the determination result is affirmative, step S114 is executed; when the determination result is negative, step S103 is executed.

In summary, the invention provides an image capture device with VRR signal processing capability and its image processing method. It can generate corresponding output packets according to different image signal sources. For example, if the image signal source is a VRR signal, it can generate a dynamic-frame-interval output packet so that the electronic device at the backend can display or record images with the VRR signal. Alternatively, if the image signal source is a fixed-refresh-rate signal, it can generate a fixed-frame-interval output packet so that the electronic device at the backend can display or record images with the fixed-refresh-rate signal. Therefore, through the image capture device and its image processing method of the invention, the image capture device can process the VRR signals and obtain high-resolution and smooth images or video.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. An image processing method for an image capture device, comprising: receiving an image signal source, wherein the image signal source has a plurality of image frames and a plural of information, and the plural information are a plural of image information or a plurality of variable refresh rate (VRR)-related information, and the plural image information and the plural VRR-related information corresponds to the plural image frames; determining whether the image signal source is a VRR signal and generating a determination result accordingly; generating a time stamp corresponding to each image frame according to the plural VRR-related information when the determination result is affirmative, wherein the time stamps correspond to a dynamic frame interval, respectively; generating the time stamp corresponding to each image frame according to plural image information when the determination result is negative, wherein the time stamps correspond to a fixed frame interval, respectively; converting the image frames into a corresponding output packet, respectively; and generating a dynamic-frame-interval output packet or a fixed-frame-interval output packet by integrating the output packets with each respective time stamps, respectively.

2. The image processing method of claim 1, wherein before determining whether the image signal source is the VRR signal, further comprising:

detecting whether a capability to detect a VRR setting parameter is presented; and collecting the plural VRR-related information from the image signal source when the capability to detect the VRR setting parameter is not presented.

3. The image processing method of claim 2, wherein the plural VRR-related information comprises a resolution information, a frame output frequency, an image width information, an image height information, or a clock frequency information.

4. The image processing method of claim 2, wherein in the step of detecting the capability to detect the VRR setting parameter is presented further comprises simultaneously detecting whether an HDMI VRR signal, a FreeSync VRR signal and/or a G-Sync VRR signal can be detected.

5. The image processing method of claim 1, further comprising:

simultaneously monitoring the image signal source when outputting the dynamic-frame-interval output packet or the fixed-frame-interval output packet;

determining whether the image signal source is present;

utilizing the fixed frame interval when the image signal source is not present; determining whether the image signal source has changed when the image signal source is present;

continuously monitoring the image signal sources received if the determination result is no change; and further determining whether the image signal source is the VRR signal if the determination result is a change.

6. The image processing method of claim 1, wherein the dynamic-frame-interval output packet or the fixed-frame-interval output packet is output to an electronic device and before the step of converting the image frames into the corresponding output packets, respectively, the method further comprising:

determining whether a setting of the electronic device achieves optimal image smoothness; and prompting an optimal setting value on the electronic device when the determination result is negative.

7. An image processing method for an image capture device, comprising: receiving an image signal source by a receiving unit, wherein the image signal source has a plurality of image frames and a plurality of variable refresh rate (VRR)-related information, wherein the VRR-related information corresponds to the plural image frames; generating a time stamp corresponding to each image frame according to the plural of VRR-related information, wherein the time stamps correspond to a dynamic frame interval, respectively; converting the image frames into a corresponding output packet, respectively; and generating a dynamic-frame-interval output packet by integrating the output packets with the respective time stamps, respectively.

8. The image processing method of claim 7, wherein the image signal source further comprises a plurality of image information corresponding to the image frames, and the method further comprising:

generating the time stamps corresponding to each image frame according to the plural image information when the image signal source is not the VRR signal, wherein the time stamps correspond to a fixed frame interval; and generating a fixed-frame-interval output packet after converting the image frames into the output packets, respectively.

9. An image capture device, comprising: a receiving circuit received an image signal source, which has a plurality of image frames and a plurality of image information or a plurality of variable refresh rate (VRR)-related information that the plural image information or the plural VRR-related information corresponds to the plural image frames; an image processing circuit coupled with the receiving circuit to receive the image signal source, to determine whether the image signal source is a VRR signal, and to output a determination result and the image signal source; a computing circuit coupled with the image processing circuit to receive the determination result and the image signal source, and to process the image signal source according to the determination result, wherein when the determination result is affirmative, the computing circuit generates a time stamp corresponding to each image frame according to the plural VRR-related information, and the time stamps correspond to a dynamic frame interval, wherein when the determination result is negative, the computing circuit generates the time stamp corresponding to each image frame according to plural image information, and the time stamps correspond to a fixed frame interval; and a communication processing circuit coupled with the computing circuit to convert the image frames into a corresponding output packet, respectively, and to generate a dynamic-frame-interval output packet or a fixed-frame-interval output packet by integrating the output packets with the respective time stamps, respectively.

10. The image capture device of claim 9, wherein the time stamp is computed according to a resolution information, a clock frequency information, and/or a counter value information of the image signal source.

* * * * *